(12) United States Patent
Yang

(10) Patent No.: US 11,227,526 B2
(45) Date of Patent: Jan. 18, 2022

(54) DISPLAY PANEL AND PROCESSING DEVICE THEREOF

(71) Applicant: HKC CORPORATION LIMITED, Shenzhen (CN)

(72) Inventor: Chunhui Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/042,181

(22) PCT Filed: Dec. 6, 2018

(86) PCT No.: PCT/CN2018/119456
§ 371 (c)(1),
(2) Date: Sep. 28, 2020

(87) PCT Pub. No.: WO2020/098019
PCT Pub. Date: May 22, 2020

(65) Prior Publication Data
US 2021/0118350 A1    Apr. 22, 2021

(30) Foreign Application Priority Data

Nov. 12, 2018  (CN) .......................... 201821857717.8

(51) Int. Cl.
*G06F 1/18* (2006.01)
*G09G 3/20* (2006.01)

(52) U.S. Cl.
CPC .............. *G09G 3/20* (2013.01); *G06F 1/189* (2013.01); *G09G 2300/0426* (2013.01)

(58) Field of Classification Search
None
See application file for complete search history.

(56) References Cited

U.S. PATENT DOCUMENTS

| 6,624,868 B1 | 9/2003 | Terukina et al. |
| 9,775,248 B2 * | 9/2017 | Kim .................... H01L 27/3276 |
| 2018/0061304 A1 * | 3/2018 | Wang .................... G09G 3/006 |

FOREIGN PATENT DOCUMENTS

| CN | 1550860 A | 12/2004 |
| CN | 1790143 A | 6/2006 |
| CN | 102253507 A | 11/2011 |
| CN | 203519982 U | 4/2014 |
| CN | 105515927 A | * 4/2016 |
| CN | 108227268 A | 6/2018 |

OTHER PUBLICATIONS

Jinjing Feng, the ISA written comments, Jul. 2019, CN.
Jinjing Feng, the international Search Report, dated Jul. 2019, CN.

* cited by examiner

*Primary Examiner* — Duane N Taylor, Jr.

(57) ABSTRACT

This application discloses a display panel and a processing device thereof. The display panel includes: a display screen and a connection terminal arranged at an edge of the display screen; a driver chip assembly connected to the connection terminal; a driver chip output pin arranged on a side, close to the connection terminal, of the driver chip assembly; a terminal pin connected to the driver chip output pin by bonding; and a fanout region arranged on a side, away from the edge of the display screen, of the terminal pin, where an insertion length of the terminal pin is greater than the length of an overlap region of the driver chip output pin and the terminal pin, where the terminal pin is higher than the fanout region.

18 Claims, 4 Drawing Sheets

DISPLAY PANEL AND PROCESSING DEVICE THEREOF

CROSS REFERENCE OF RELATED APPLICATIONS

This application claims the priority to the Chinese Patent Application No. 201821857717.8, filed with National Intellectual Property Administration, PRC on Nov. 12, 2018 and entitled "DISPLAY PANEL AND PROCESSING DEVICE THEREOF", which is incorporated herein by reference in its entirety.

TECHNICAL FIELD

This application relates to the field of display technologies, and in particular, to a display panel and a processing device thereof.

BACKGROUND

Statement herein merely provides background information related to this application and does not necessarily constitute the existing technology.

With development and advancement of science and technologies, due to hot spots such as thinness, power saving, and low radiation, liquid crystal displays become mainstream products of displays and are widely applied. Thin Film Transistor-Liquid Crystal Displays (TFT-LCDs) are generally processed by the four major processes: an array process, a color film process, a cell process, and a module process. The module process, also referred to as an assembly project, is to crimp a driver circuit and install a backlight and other components on a display screen. The module process sequentially includes the steps of attachment of a polarizer, Tape Auto-bonding (TAB) of a driver chip, bonding of a Printed Circuit board (PCB), loop adjustment of the driver circuit, and matching of the backlight.

During TAB of the driver chip, a terminal pin of the display screen is bonded to a driver chip output pin, and the driver chip output pin may be excessively inserted into the display panel, so that the portion, inserted into the display panel, of the driver chip output pin warps.

SUMMARY

This application provides a display panel and a processing device thereof for preventing the portion, inserted into the display panel, of a driver chip output pin from warping.

In order to achieve the above objective, this application provides a display panel, including: a display screen and a connection terminal arranged at an edge of the display screen; a driver chip assembly provided with a driver chip and connected to the connection terminal; a driver chip output pin arranged on a side, close to the connection terminal, of the driver chip assembly; a terminal pin arranged at the connection terminal and connected to the driver chip output pin by bonding; and a fanout region arranged on a side, away from the edge of the display screen, of the terminal pin, an insertion length of the terminal pin is greater than a length of an overlap region of the driver chip output pin and the terminal pin, the terminal pin is higher than the fanout region.

Optionally, the driver chip assembly is one of an automatic bonding tape, a tape carrier package, and a chip on film; a conductive layer is arranged on an upper surface of the terminal pin, and the conductive layer is connected to the driver chip output pin on the automatic bonding tape or the tape carrier package or the chip on film by bonding.

Optionally, the conductive layer includes a metal layer film structure.

Optionally, the terminal pin includes a substrate, a first metal layer, a first insulating layer, a second metal layer, and a second insulating layer formed in sequence; the conductive layer includes a transparent conductive layer formed on an upper surface of the second insulating layer; and the transparent conductive layer is connected to the first metal layer and the second metal layer via through holes.

Optionally, the terminal pin includes a substrate, a first metal layer, a first insulating layer, a second metal layer, and a second insulating layer formed in sequence; the conductive layer includes a transparent conductive layer formed on an upper surface of the second insulating layer; and the transparent conductive layer is connected the first metal layer via a through hole.

Optionally, the terminal pin includes a substrate, a first metal layer, a first insulating layer, a second metal layer, and a second insulating layer formed in sequence; the conductive layer includes a transparent conductive layer formed on an upper surface of the second insulating layer; and the transparent conductive layer is connected to the second metal layer via a through hole.

Optionally, the insertion length of the terminal pin is at least one fifth longer than an overlap length of the driver chip output pin.

Optionally, the terminal pin is not longer than twice an overlap length of the driver chip output pin.

Optionally, the terminal pin is shorter than or equal to the driver chip output pin.

Optionally, the insertion length of the terminal pin is greater than a standard bonding length plus an error threshold.

Optionally; the error threshold is less than 500 µm and more than 0.

Optionally; the terminal pin includes a pin region arranged on the side close to the driver chip output pin, and a heightening portion arranged on a side, away from the driver chip output pin, of the pin region; the conductive layer is arranged on an upper surface of the pin region, and no conductive layer is arranged on an upper surface of the heightening portion.

Optionally, the terminal pin includes a substrate, a first metal layer, a first insulating layer, a second metal layer, and a second insulating layer formed in sequence; the conductive layer includes a transparent conductive layer formed on an upper surface of the second insulating layer; the transparent conductive layer is connected to one or two of the first metal layer and the second metal layer via a through hole respectively; the heightening portion includes the substrate, the first metal layer, the first insulating layer, and the second insulating layer formed in sequence; the heightening portion is as high as the terminal pin; and the heightening portion is higher than the fanout region.

Optionally, the first metal layer is connected to a scan line in the display panel.

Optionally, the first metal layer is connected to a common electrode line in the display panel.

Optionally, the first metal layer is connected to a data line in the display panel.

This application also discloses a display panel, including: a display screen and a connection terminal arranged at an edge of the display screen; an automatic bonding tape provided with a driver chip and connected to the connection terminal; a driver chip output pin arranged on a side, close to the connection terminal, of the driver chip assembly; a terminal pin arranged at the connection terminal and connected to the driver chip output pin by bonding; and a fanout region arranged on a side, away from the edge of the display screen, of the terminal pin, the terminal pin includes a substrate, a first metal layer, a first insulating layer, a second metal layer, and a second insulating layer formed in sequence; a conductive layer is arranged on an upper surface of the terminal pin; the conductive layer includes a transparent conductive layer formed on an upper surface of the second insulating layer; the transparent conductive layer is connected to one or two of the first metal layer and the second metal layer via a through hole respectively; an insertion length of the terminal pin is greater than a length of the driver chip output pin plus an error threshold; and the error threshold is less than 500 μm and more than 0.

This application also discloses a processing device for processing a display panel as described above, including: a crimping head for crimping a terminal pin and a driver chip output pin, the crimping head is as long as the terminal pin.

The driver chip output pin may be excessively inserted into the display panel when the driver chip output pin is bonded to the terminal pin, specifically, the side, away from the edge of the display screen, of the driver chip output pin extends beyond the side, away from the edge of the display screen, of the terminal pin. The overlap region is the contact portion of the terminal pin and the fanout region, the fanout region is usually lower than the terminal pin, and the height difference between the fanout region and the terminal pin easily causes warping (up-warping or down-warping) of the driver chip output pin during bonding, thus causing the situations that a trace in the driver chip output pin is broken, or the exceeding driver chip output pin warps to damage a trace at the display screen or other structure. However, in this application, the overlap portion of the terminal pin and the driver chip output pin is shorter than the terminal pin of the display screen, the terminal pin is higher than the fallout region. The terminal pin lengthened is longer than a preset length, and the terminal pin is normally longer than the overlap region, so that even if the driver chip output pin is excessively inserted due to mis-operation or alignment failure, the driver chip output pin can be supported by the lengthened portion. Thus, the support surface is flat during crimping and bonding of the crimping head, warping of the driver chip output pin during bonding is reduced and even avoided to prevent the warping driver chip output pin from being broken or from being in poor contact due to loosening of outward peeling in the presence of external force, and the yield is improved.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION OF EMBODIMENTS

Figure 1:
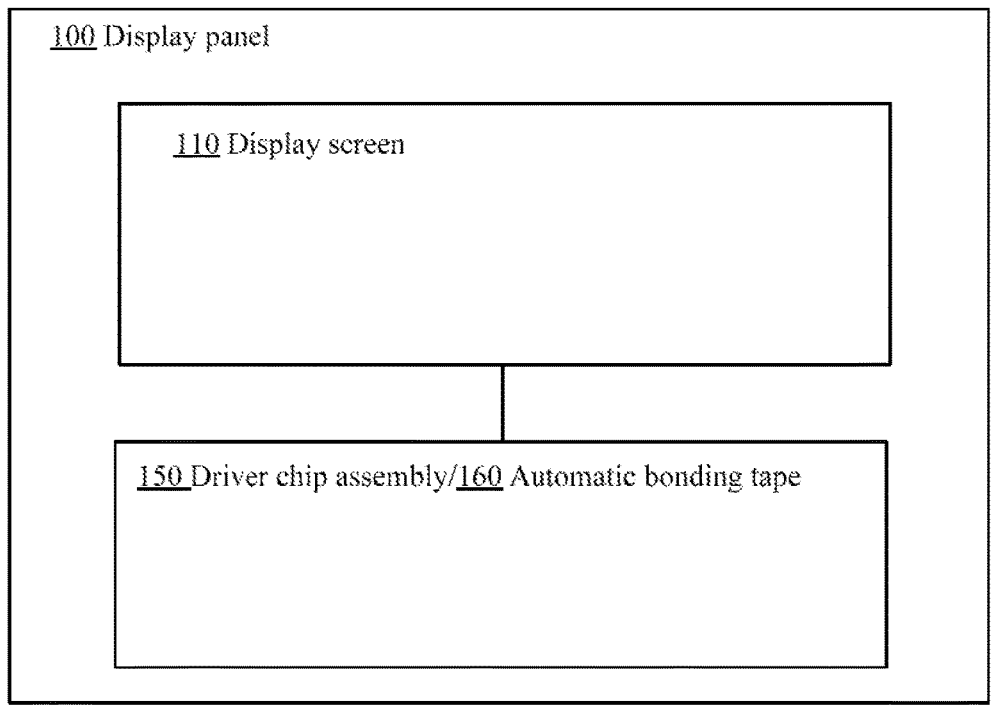
FIG. 1 is a schematic diagram of a display panel according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or, implicitly includes one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, and/or operations, but do not preclude the presence or addition of one or more other features, integers, steps, operations, and/or combinations thereof.

The following further describes this application with reference to the accompanying drawings and exemplary embodiments.

Figure 2:
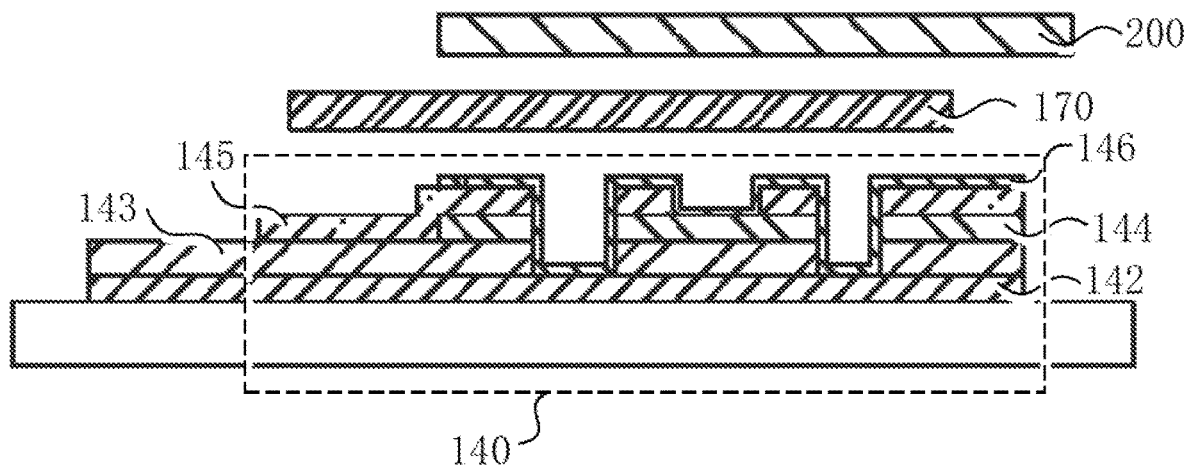
FIG. 2 is a schematic diagram indicating normal bonding of the display panel according to an embodiment of this application.
Figure 3:
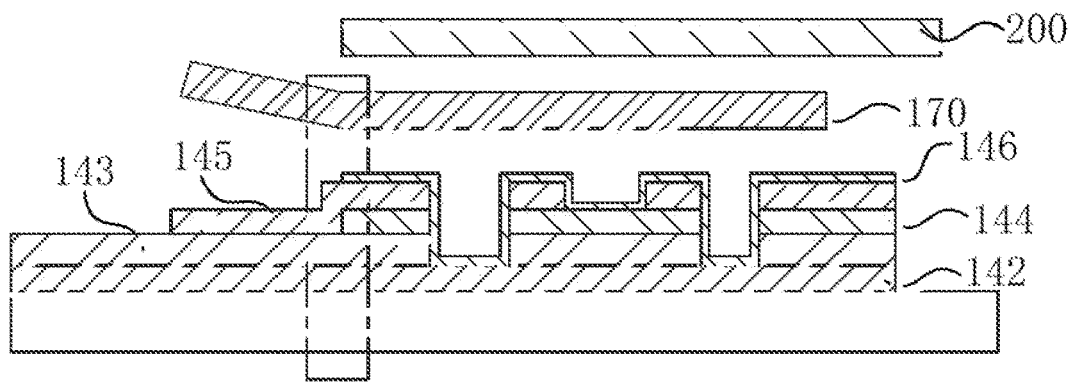
FIG. 3 is a schematic diagram indicating warping of a driver chip output pin after bonding of the display panel according to an embodiment of this application.
Figure 4:
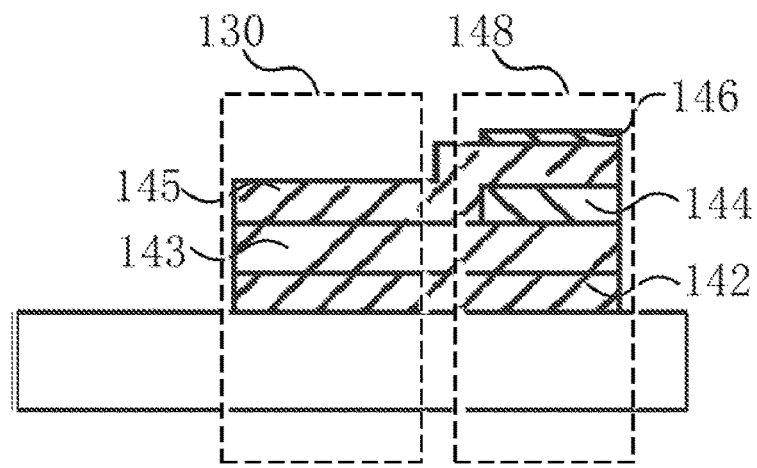
FIG. 4 is a schematic diagram of a lengthened region of a terminal pin of a display screen according to an embodiment of this application.
Figure 5:
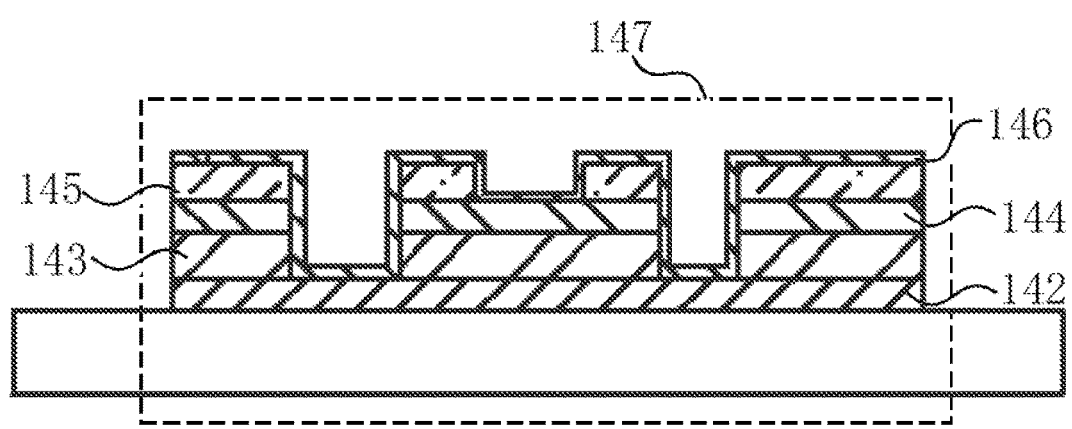
FIG. 5 is a schematic diagram of a pin region of the display screen according to an embodiment of this application.
Figure 6:
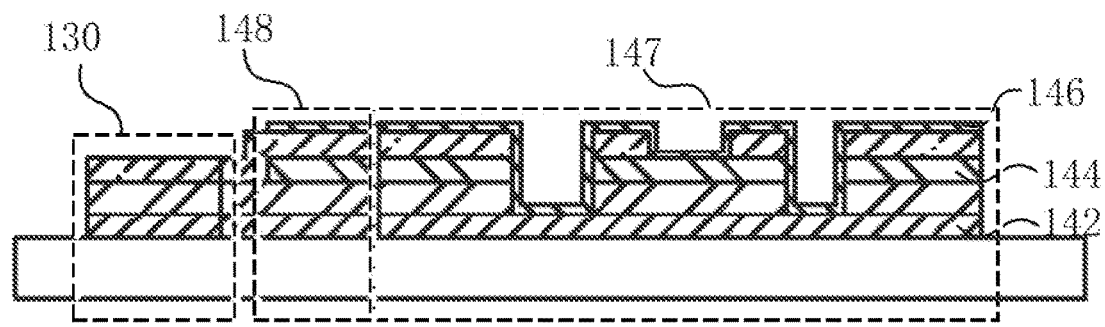
FIG. 6 is a complete schematic diagram of the terminal pin of the display screen according to an embodiment of this application.
Figure 7:
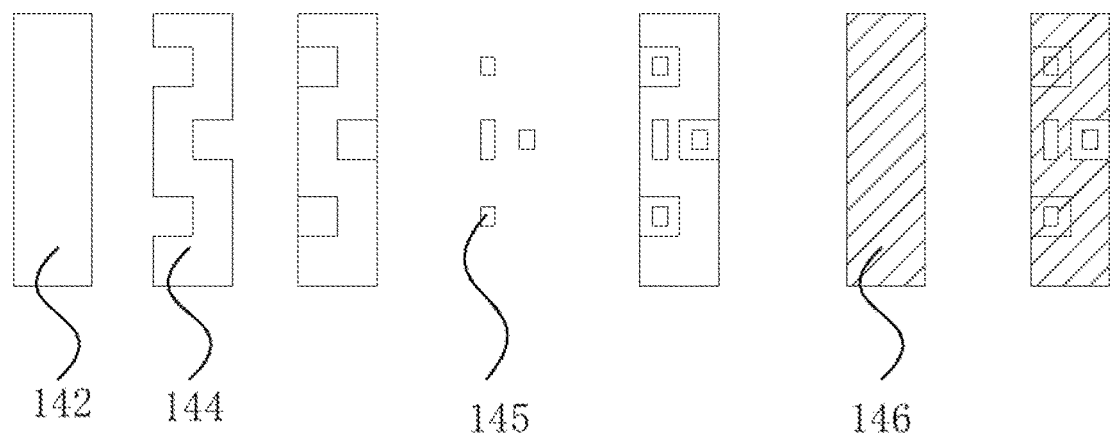
FIG. 7 is a schematic diagram of the terminal pin of the display screen and the driver chip output pin according to an embodiment of this application.
Figure 8:
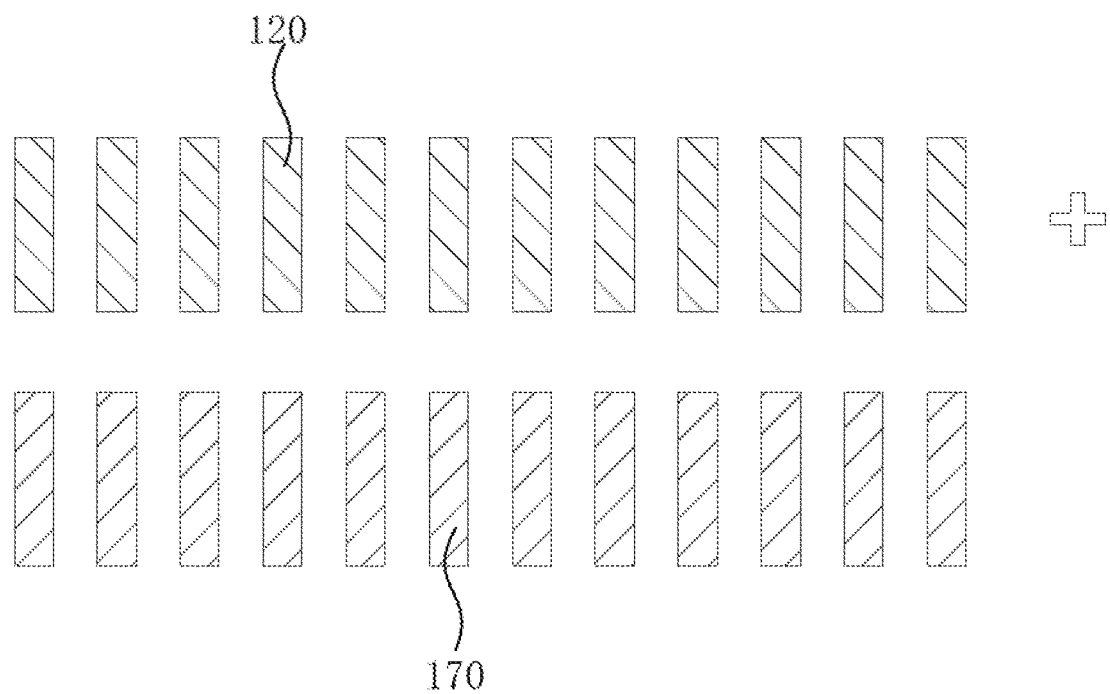
FIG. 8 is a schematic diagram of each structure layer of the terminal pin of the display screen according to an embodiment of this application.
Figure 9:
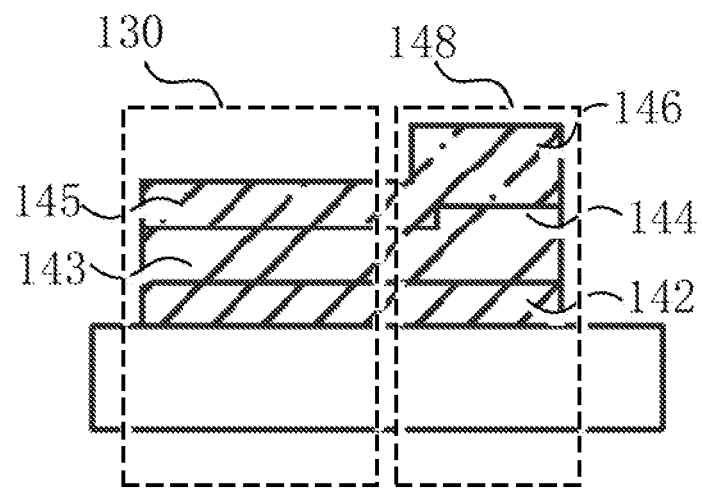
FIG. 9 is a schematic diagram of a lengthened region of a terminal pin of another display screen according to an embodiment of this application.
Figure 10:
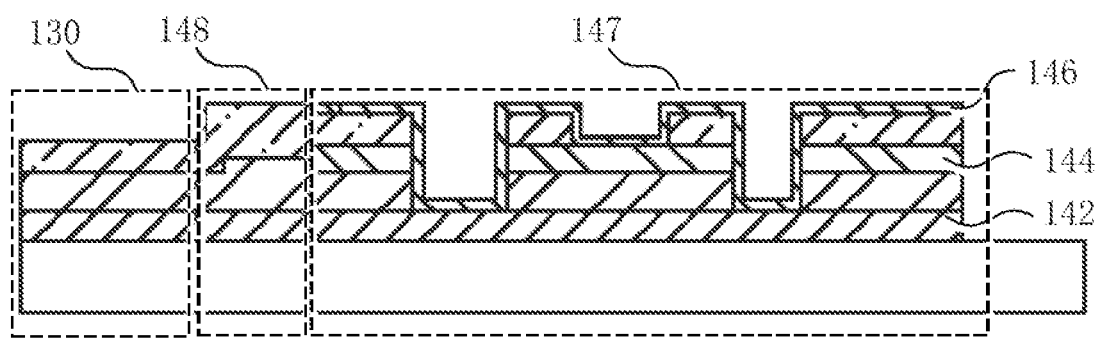
FIG. 10 is a complete schematic diagram of the terminal pin of another display screen according to an embodiment of this application.

As shown in FIG. 1 to FIG. 10, an embodiment of this application discloses a display panel 100, including: a display screen 110; a connection terminal 120 arranged at an edge of the display screen 110; a driver chip assembly 150 connected to the connection terminal 120 and provided with a driver chip; a driver chip output pin 170 arranged on a side, close to the connection terminal 120, of the driver chip assembly 150; and a fanout region 130 arranged on a side, away from the edge of the display screen 110, of a terminal pin 140; an insertion length of the terminal pin 140 is greater than a length of an overlap region of the driver chip output pin 170 and the terminal pin 140; the terminal pin 140 is higher than the fanout region 130.

In this solution, when the driver chip output pin 170 is bonded to the terminal pin 140, the driver chip output pin 170 may be excessively inserted into the display panel 100, specifically, a side, away from the edge of the display screen 110, of the driver chip output pin 170 extends beyond the side, away from the edge of the display screen 110, of the terminal pin 140. The overlap region is a contact portion of the terminal pin 140 and the fallout region 130, the fanout region 130 is usually lower than the terminal pin 140, and the height difference between the fanout region 130 and the terminal pin 140 easily causes warping (up-warping or down-warping) of the driver chip output pin 170 during bonding, thus causing the situations that a trace in the driver chip output pin 170 is broken, or the driver chip output pin 170 extending out warps to damage a trace at the display screen 110 or other structure. However, in this application, the overlap portion of the terminal pin 140 and the driver chip output pin 170 is shorter than the terminal pin 140 of the display screen 110, and the terminal pin 140 is higher than the fanout region 130. The terminal pin 140 lengthened is longer than a preset length, and the terminal pin 140 is normally longer than the overlap region, so that even if the driver chip output pin 170 is excessively inserted due to mis-operation or alignment failure, the driver chip output pin 170 can be supported by the lengthened portion. Thus, the support surface is flat during crimping and bonding of a crimping head 200, warping of the driver chip output pin 170 during bonding is reduced and even avoided to prevent the warping driver chip output pin 170 from being broken or from being in poor contact due to loosening of outward peeling in the presence of external force, and the yield is improved.

In one or more embodiments, the driver chip assembly 150 is one of an automatic bonding tape 160, a tape carrier package, and a chip on film; a conductive layer is arranged on an upper surface of the terminal pin 140, and the conductive layer is connected to the driver chip output pin on the automatic bonding tape 160 or the tape carrier package or the chip on film by bonding.

The driver chip assembly 150 of this solution may be any one of the automatic bonding tape 160, the tape carrier package, and the chip on film; the conductive layer is arranged on the upper surface of the terminal pin 140, that is, the terminal pin 140 before lengthening design and the portion increased by the lengthening design can be used for signal transmission, or the terminal pin 140 is considered to include a pin region 147 and a lengthened portion which are manufactured by the same mask process and have the same function; because the pin region 147 is lengthened by the lengthened portion, the conductive layer used as a transmission medium after bonding is also lengthened, and when the driver chip output pin 170 is excessively inserted, an effective contact area (conductive area) between the driver chip output pin 170 and the terminal pin 140 is not reduced but increased, which effectively improves the stability of external signal transmission to the display panel 100. The conductive layer may be a transparent conductive layer 146 or the like to connect signal lines (which may include gate lines, data lines, common electrode lines, etc.) in the pin region 147 to a layer film structure on the upper surface of the terminal pin 140, or be of a naked metal layer film structure.

In one or more embodiments, the terminal pin 140 includes a substrate, a first metal layer 142, a first insulating layer 143, a second metal layer 144, and a second insulating layer 145 formed in sequence; the conductive layer includes a transparent conductive layer 146 formed on an upper surface of the second insulating layer 145; and the transparent conductive layer 146 is connected to one or two of the first metal layer 142 and the second metal layer 111 via through holes.

In this solution, the transparent conductive layer 146 is connected to one or two of the first metal layer 142 and the second metal layer 144, the transparent conductive layer 146 is also connected to different metal layers according to different lines and then bonded with the driver chip output pin 170 to receive corresponding signals transmitted by a driver chip 200, and the lengthened terminal pin 140 can also ensure that the contact area is not reduced but even increased to ensure the stability of connection even if the driver chip output pin 170 is normally inserted.

The terminal pin 140 of the display screen 110 may correspond to a common electrode line, or a gate line, or a data line, or other signal lines. When the terminal pin 140 corresponds to the common electrode line, the transparent conductive layer 146 may be connected to one or two of the first metal layer 142 according to the specific situation, and then connected to the common electrode line via the fallout region 130 or a through hole. When the terminal pin 140 corresponds to the gate line, the transparent conductive layer 146 is generally and conductively connected to the first metal layer 142, the second metal layer 144 may be or may not be provided, the transparent conductive layer 146 may be or may not be in contact with the second metal layer 144 (for example, the second metal layer 144 is not conductive in plane, even if contact exists via a through hole), but in any case, the transparent conductive layer 146 is eventually only connected to the gate line. When the terminal pin 140 corresponds to the data line, the transparent conductive layer 146 may be connected to one or two of the first metal layer 142 and the second metal layer 144, but in plane, only connected to the corresponding data line.

In one or more embodiments, the insertion length of the terminal pin 140 is at least one fifth longer than an overlap length of the driver chip output pin 170.

Because the driver chip output pin 170 may be excessively inserted during bonding, the driver chip output pin 170 is prone to such situation as warping and breaking during crimping; in this solution, the terminal pin 140 of the display screen 110 is longer than the predetermined overlap length of the driver chip output pin 170. Specifically, the terminal pin 140 is increased by at least one fifth of the length of the driver chip output pin 170 to ensure that the driver chip output pin 170 excessively inserted during bonding does not extend beyond the range of the terminal pin 140, thereby preventing the driver chip output pin 170 extending out from being excessively inserted into the fanout region 130; the height difference between the fallout region 130 and the terminal pin 140 causes warping of the driver chip output pin 170 during bonding, and when the display screen 110 is carried, the warping driver chip output pin 170 is easily broken, and even is in poor contact due to loosening of outward peeling in the presence of external force.

In addition, the terminal pin 140 is not longer than twice the overlap length to avoid occupying too much space, or the terminal pin 140 is shorter than or equal to the driver chip output pin 170. Generally, the driver chip output pin 170 (after the trace has been bundled, the bonded region) is longer than the terminal pin 140 of the display screen 110 in order to avoid affecting the bonding step. If the terminal pin 140 is longer than the driver chip output pin 170, and the insertion length of the driver chip output pin 170 extends beyond the length of the driver chip output pin 170 itself, because the driver chip output pin 170 is bonded to a connection structure (e.g., the external fanout region 130 of the trace bundled from the driver chip 200) between the driver chip 200 and the terminal pin 140, and the connection structure is generally thicker than the terminal pin 140, the bonding is likely to cause a defective product, and thus, the maximum insertion length of the terminal pin 140 may be based on the length of the drive chip output pin 170.

In one or more embodiments, the insertion length of the terminal pin 140 is greater than a standard bonding length plus an error threshold.

In this solution, the standard bonding length refers to an overlap length of the terminal pin 140 and the driver chip output pin 170 in the case where the bonding step is error-free; and the error threshold refers to a maximum allowable error range in the general bonding process, and the error beyond the range may affect the quality and the like. In this solution, the terminal pin 140 is longer than the standard bonding length plus the error threshold, thereby ensuring that the driver chip output pin 170 does not extend beyond the range of the terminal pin 140 when a bonding error occurs, and that the longer terminal pin 140 can provide a flat support platform when the driver chip output pin 170 is excessively inserted and the insertion length extends beyond the error range. A poor bonding effect due to the height difference is eliminated, and the situations that the driver chip output pin 170 is excessively inserted into the fallout region 130 due to bonding error and warps during bonding due to the height difference between the fanout region 130 and the terminal pin 140, and that the warping driver chip output pin 170 is easily broken, or in poor contact due to loosening of outward peeling in the presence of external force when the display screen 110 is carried are prevented.

In one or more embodiments, the error threshold is less than 500 μm and more than 0.

In this solution, the error threshold is controlled to be less than 500 μm and more than 0. Generally, the bonding error of the driver chip output pin 170 is about 500 μm. If the error threshold is exceeded, the bonding yield is extremely low, and the bonding is unsuccessful. Alternatively, when the driver chip output pin 170 is excessively inserted into the display panel 100, the effective contact area between the driver chip output pin 170 and the terminal pin 140 is reduced to affect the stability of signal transmission. At the same time, the height difference between the terminal pin 140 and the fanout region 130 causes warping of the portion of the driver chip output pin 170 beyond the terminal pin 140 during bonding, and the warping driver chip output pin 170 is easily broken, or in poor contact due to loosening of outward peeling in the presence of external force when the display screen 110 is carried. In this solution, the error threshold is not too large to avoid occupying too large space. The terminal pin 140 of the display screen 110 is designed with reference to the error threshold, so that even if the insertion length of the driver chip output pin 170 extends beyond the error range due to iris-operation, a good flatness is obtained from the long enough terminal pin 140 to complete the bonding operation, and the product yield is effectively improved.

In one or more embodiments, the terminal pin 140 includes a pin region 147 arranged on the side close to the driver chip output pin 170, and a heightening portion 148 arranged on a side, away from the driver chip output pin 170, of the pin region 147; a conductive layer is arranged on an upper surface of the pin region 147, and no conductive layer is arranged on an upper surface of the heightening portion 148.

In this solution, the terminal pin 140 includes two, regions: one is the pin region 147 on the side close to the driver chip output pin 170, where the pin region 147 is a predetermined region for being bonded with the driver chip output pin 170; and the other one is the heightening portion 148 arranged on the side, away from the driver chip output pin 170, of the pin region 147, where the heightening portion 148 is obtained by heightening the fallout region 130, and is not used for signal connection after being bonded with the driver chip output pin 170. The pin region 147 and the heightening portion 148 are set to the same height, so that even if the driver chip output pin 170 is excessively inserted due to mis-operation, as long as the insertion length is not too large, the height difference is avoided in the presence of the heightening portion 148, a flat bonding support is provided, and no warping of the driver chip output pin 170 is ensured during bonding to avoid the situations that the warping driver chip output pin 170 is easily broken, or in poor contact due to loosening of outward peeling in the presence of external force when the display screen 110 is carried.

In one or more embodiments, the added portion may also be changed into a layer film structure, so that the increased height is the same as the height of the terminal pin, and the signal transmission is not affected. That is, the terminal pin 140 includes a substrate, a first metal layer 142, a first insulating layer 143, a second metal layer 144, and a second insulating layer 145 formed in sequence; the conductive layer includes a transparent conductive layer 146 formed on an upper surface of the second insulating layer 145; the transparent conductive layer 146 is connected to one or two of the first metal layer 142 and the second metal layer 114 via a through hole respectively; the heightening portion 148 includes the substrate, the first metal layer 142, the first insulating layer 143, and the second insulating layer 145 formed in sequence; the heightening portion 148 is as high as the terminal pin 140; and the heightening portion 148 is higher than the fallout region 130.

In this solution, the layer film structure of the same heightening portion 148 is different from that of the pin region 147. In particular, no conductive layer for signal connection after bonding is arranged on the upper surface of the heightening portion 148. The layer film structure of the heightening portion 148 may include the first metal layer 142, the first insulating layer 143 and the second insulating layer 145 that also form with the pin region 147 on the same layer, or include the first metal layer 142, the first insulating layer 143, the second metal layer 144 and the second insulating layer 145, as long as no conductive layer is arranged on the upper surface of the heightening portion 148, and the heightening portion 148 has a final height equivalent to that of the pin region 147, and the corresponding signal line in plane is connected via the metal layers therein. The heightening portion 148 is conductively connected to the fanout region 130, which ensures normal transmission of data, and can reduce warping of the driver chip output pin 170, achieving two goals with one stroke.

The heightening portion 148 is manufactured by the same process as the fanout region 130, but one or more layers thereof are thicker than the fanout region 130, thereby reaching the height of the terminal pin 140. The first metal layer 142 is generally used as a scan line in the connection plane, and of course, may be connected to a common electrode line or a data line, to realize cross-layer connection via a through hole or the like as needed.

As another embodiment of this application, referring to FIG. 1 to FIG. 8, a display panel 100 is disclosed, including: a display screen 110; a connection terminal 120 arranged at an edge of the display screen 110; an automatic bonding tape 160 provided with a driver chip and connected to the connection terminal 120; a driver chip output pin 170 arranged on a side, close to the connection terminal 120, of the driver chip assembly 150; a terminal pin 140 arranged at the connection terminal 120 and connected to the driver chip output pin by bonding; and a fanout region 130 arranged on a side, away from the edge of the display screen 110, of the terminal pin 140. The terminal pin 140 includes a substrate, a first metal layer 142, a first insulating layer 143, a second metal layer 144, and a second insulating layer 145 formed in sequence. A conductive layer is arranged on an upper surface of the terminal pin 140. The conductive layer includes a transparent conductive layer 146 formed on an upper surface of the second insulating layer 145. The transparent conductive layer 146 is connected to one or two of the first metal layer 142 and the second metal layer 144 via a through hole respectively. An insertion length of the terminal pin 140 is greater than a length of the driver chip output pin 170 plus an error threshold, and the error threshold is less than 500 μm and more than 0.

In this solution, the insertion length of the terminal pin 140 is greater than the total length of a standard bonding length and an error threshold, and the error threshold is more than 0 and less than 500 μm. When the driver chip output pin 170 is bonded to the terminal pin 140, if the driver chip output pin 170 is inserted into the display screen 110, the portion, longer than the driver chip output pin 170, of the terminal pin 140 can prevent the driver chip output pin 170 from being inserted into the fanout region 130. The insertion portion of the driver chip output pin 170 warps during bonding, and when the display screen 110 is carried, the warping driver chip output pin 170 is easily broken, or in poor contact due to loosening of outward peeling in the presence of external force.

As another embodiment of this application, referring to FIG. 1 to FIG. 10, a processing deuce for processing a display panel 100 as described above is disclosed, including: a crimping head 200 for crimping a terminal pin 140 and a driver chip output pin 170. The crimping head 200 is as long as the terminal pin 140.

In this solution, when the terminal pin 140 is bonded to the driver chip output pin 170, a crimping head 200 is required for crimping. When an insertion length of the terminal pin 140 is increased, a length of the crimping head 200 is also increased accordingly, so that the crimping head 200 is as long as the terminal pin 140 to prevent the driver chip output pin 170 from warping when being inserted into the display screen 110 and the crimping head 200 does not change. Therefore, the crimping head 200 is as long as the terminal pin 140, which can prevent the warping driver chip output pin 170 from being broken or from being in poor contact due to loosening of outward peeling in the presence of external force.

The technical solutions of this application can be widely applied to a flat panel display such as a TFT-LCD and an OLED display.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:
1. A display panel, comprising:
   a display screen;
   a connection terminal arranged at an edge of the display screen;
   a driver chip assembly provided with a driver chip and connected to the connection terminal;
   a driver chip output pin arranged on a side, close to the connection terminal, of the driver chip assembly;
   a terminal pin arranged at the connection terminal and connected to the driver chip output pin by bonding; and
   a fanout region arranged on a side, away from the edge of the display screen, of the terminal pin,
   wherein an insertion length of the terminal pin is greater than a length of an overlap region of the driver chip output pin and the terminal pin; and the terminal pin is higher than the fanout region.
2. The display panel according to claim 1, wherein the driver chip assembly is one of an automatic bonding tape, a tape carrier package, and a chip on film;
   a conductive layer is arranged on an upper surface of the terminal pin, and the conductive layer is connected to the driver chip output pin on the automatic bonding tape or the tape carrier package or the chip on film by bonding.
3. The display panel according to claim 2, wherein the conductive layer comprises a metal layer film structure.
4. The display panel according to claim 2, wherein the terminal pin comprises a substrate, a first metal layer, a first insulating layer, a second metal layer, and a second insulating layer formed in sequence;

the conductive layer comprises a transparent conductive layer formed on an upper surface of the second insulating layer; and the transparent conductive layer is connected to the first metal layer and the second metal layer via through holes.

5. The display panel according to claim 2, wherein the terminal pin comprises a substrate, a first metal layer, a first insulating layer, a second metal layer, and a second insulating layer formed in sequence;

the conductive layer comprises a transparent conductive layer formed on an upper surface of the second insulating layer; and the transparent conductive layer is connected to the first metal layer via a through hole.

6. The display panel according to claim 2, wherein the terminal pin comprises a substrate, a first metal layer, a first insulating layer, a second metal layer, and a second insulating layer formed in sequence;

the conductive layer comprises a transparent conductive layer formed on an upper surface of the second insulating layer; and the transparent conductive layer is connected to the second metal layer via a through hole.

7. The display panel according to claim 2, wherein the insertion length of the terminal pin is at least one fifth longer than an overlap length of the driver chip output pin.

8. The display panel according to claim 2, wherein the terminal pin is not longer than twice an overlap length of the driver chip output pin.

9. The display panel according to claim 2, wherein the terminal pin is shorter than or equal to the driver chip output pin.

10. The display panel according to claim 2, wherein the insertion length of the terminal pin is greater than a standard bonding length plus an error threshold.

11. The display panel according to claim 10, wherein the error threshold is less than 500 μm and more than 0.

12. The display panel according to claim 2, wherein the terminal pin comprises a pin region arranged on the side close to the driver chip output pin, and a heightening portion arranged on a side, away from the driver chip output pin, of the pin region;

the conductive layer is arranged on an upper surface of the pin region, and no conductive layer is arranged on an upper surface of the heightening portion.

13. The display panel according to claim 12, wherein the terminal pin comprises a substrate, a first metal layer, a first insulating layer, a second metal layer, and a second insulating layer formed in sequence;

the conductive layer comprises a transparent conductive layer formed on an upper surface of the second insulating layer; the transparent conductive layer is connected to one or two of the first metal layer and the second metal layer via a through hole respectively;

the heightening portion comprises the substrate, the first metal layer, the first insulating layer, and the second insulating layer formed in sequence;

the heightening portion is as high as the terminal pin; and the heightening portion is higher than the fanout region.

14. The display panel according to claim 13, wherein the first metal layer is connected to a scan line in the display panel.

15. The display panel according to claim 13, wherein the first metal layer is connected to a common electrode line in the display panel.

16. The display panel according to claim 13, wherein the first metal layer is connected to a data line in the display panel.

17. A display panel, comprising:

a display screen;

a connection terminal arranged at an edge of the display screen;

an automatic bonding tape provided with a driver chip and connected to the connection terminal;

a driver chip output pin arranged on a side of, close to the connection terminal, the driver chip assembly;

a terminal pin arranged at the connection terminal and connected to the driver chip output pin by bonding; and a fanout region arranged on a side, away from the edge of the display screen, of the terminal pin;

wherein the terminal pin comprises a substrate, a first metal layer, a first insulating layer, a second metal layer, and a second insulating layer formed in sequence;

a conductive layer is arranged on an upper surface of the terminal pin, and the conductive layer is connected to the driver chip output pin on the automatic bonding tape by bonding;

the conductive layer comprises a transparent conductive layer formed on an upper surface of the second insulating layer; and the transparent conductive layer is connected to one or two of the first metal layer and the second metal layer via a through hole respectively;

an insertion length of the terminal pin is greater than a length of the driver chip output pin plus an error threshold; and the error threshold is less than 500 μm and more than 0.

18. A processing device for processing a display panel, comprising:

a crimping head for crimping a terminal pin and a driver chip output pin, wherein the crimping head is as long as the terminal pin.

* * * * *